(12) United States Patent
Tseng

(10) Patent No.: US 10,380,182 B2
(45) Date of Patent: *Aug. 13, 2019

(54) RANKING VIDEOS FOR A USER

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,540

(22) Filed: Aug. 31, 2015

(65) Prior Publication Data

US 2015/0370807 A1 Dec. 24, 2015

Related U.S. Application Data

(63) Continuation of application No. 13/783,593, filed on Mar. 4, 2013, now Pat. No. 9,165,069.

(51) Int. Cl.
*G06F 16/78* (2019.01)
*G06F 16/70* (2019.01)
(Continued)

(52) U.S. Cl.
CPC .......... *G06F 16/7867* (2019.01); *G06F 16/70* (2019.01); *G06F 16/738* (2019.01);
(Continued)

(58) Field of Classification Search
CPC .......... G06F 17/30781; G06F 17/3082; G06F 17/30837; G06F 17/3053; H04L 67/10; H04L 67/02; H04L 67/306; H04L 65/403;
H04L 65/4084; H04L 67/22; H04L 12/1813; H04L 12/1818; H04L 12/588; H04L 41/12; H04L 51/04; H04L 51/046;
(Continued)

(56) References Cited

U.S. PATENT DOCUMENTS 7,814,406 B2    10/2010   Ozawa
8,606,872 B1 *  12/2013   Reitnour .......... G06F 15/17306
                                                          709/203
(Continued)

FOREIGN PATENT DOCUMENTS

JP    2008-527855    7/2008
JP    2008-527856    7/2008
(Continued)

OTHER PUBLICATIONS

Notice of Acceptance for AU Patent Application 2014226185, dated May 10, 2016.
(Continued)

*Primary Examiner* — Greg C Bengzon
(74) *Attorney, Agent, or Firm* — Baker Botts L.L.P.

(57) ABSTRACT

In one embodiment, a method includes determining by a computing device a set of videos that a user may watch. For each video, a coefficient value is determined for each of one or more coefficient factors. At least one of the coefficient factors has a value that would be coincident with the user watching the video. A video coefficient for each video is calculated based on the coefficient values of its coefficient factors, and the videos are ranked based on their video coefficients. The rankings are then provided for presentation to the user.

18 Claims, 4 Drawing Sheets

(51) Int. Cl.
*G06F 16/738* (2019.01)
*H04N 21/466* (2011.01)
*H04N 21/25* (2011.01)
*H04L 29/08* (2006.01)

(52) U.S. Cl.
CPC ............ *H04L 67/10* (2013.01); *H04N 21/251* (2013.01); *H04N 21/4668* (2013.01)

(58) Field of Classification Search
CPC ..... H04L 51/10; H04L 65/60; H04L 67/2823; H04L 12/5845; H04L 29/08; H04L 65/1069; H04L 65/1089; H04L 65/4092; H04L 67/00; H04N 21/251; H04N 21/4668; H04N 21/4788; H04N 21/4758; H04N 21/482; H04N 21/252; H04N 21/462; H04N 21/4826; H04N 21/812; H04N 21/258; H04N 21/25866; H04N 21/4314; H04N 21/4622; H04N 21/47202; H04N 21/478; H04N 21/6582; H04N 7/147; H04N 7/17318; H04N 2005/44578; H04N 21/23; H04N 21/23424; H04N 21/23617; H04N 21/2401; H04N 21/25891; H04N 21/26258; H04N 21/26266; H04N 21/2665; H04N 21/2668; H04N 21/2743; H04N 21/2747; H04N 21/41407; H04N 21/42203; H04N 21/4227; H04N 21/4312; H04N 21/4316; H04N 21/4331; H04N 21/4334; H04N 21/4394; H04N 21/44016; H04N 21/4532; H04N 21/454; H04N 21/458; H04N 21/4667; H04N 21/47205; H04N 21/47214; H04N 21/4725; H04N 21/4755; H04N 21/4784; H04N 21/4786; H04N 21/4821; H04N 21/6175; H04N 21/6543; H04N 21/8126; H04N 21/8352; H04N 21/84; H04N 21/8456; H04N 21/858; H04N 21/8586; H04N 5/44543; H04N 7/16; G06Q 50/01; G06Q 30/0201; G06Q 30/0203; G06Q 30/0242; G06Q 30/0245; G06Q 30/0631
See application file for complete search history.

(56) References Cited

U.S. PATENT DOCUMENTS

| | | | | |
|---|---|---|---|---|
| 8,631,473 B2* | 1/2014 | Bhatia | H04N 21/252 | 725/10 |
| 8,863,185 B2 | 10/2014 | Stinson, III | | |
| 8,935,327 B1* | 1/2015 | Agassy | H04L 51/32 | 709/203 |
| 9,185,348 B2* | 11/2015 | Choi | H04N 21/252 | |
| 9,699,503 B2* | 7/2017 | Fishman | H04N 21/252 | |
| 2004/0249713 A1* | 12/2004 | Gross | G06Q 30/02 | 705/14.41 |
| 2006/0282856 A1* | 12/2006 | Errico | G06Q 30/02 | 725/46 |
| 2008/0127280 A1 | 5/2008 | Kuang | | |
| 2009/0089294 A1* | 4/2009 | Davis | H04N 7/17318 | |
| 2009/0148124 A1* | 6/2009 | Athsani | G06Q 30/02 | 386/241 |
| 2009/0254931 A1* | 10/2009 | Pizzurro | G06Q 30/02 | 725/5 |
| 2009/0271820 A1* | 10/2009 | Choi | H04N 21/252 | 725/37 |
| 2009/0271826 A1 | 10/2009 | Lee | | |
| 2010/0094866 A1* | 4/2010 | Cuttner | G06F 17/30035 | 707/723 |
| 2011/0040760 A1* | 2/2011 | Fleischman | G06Q 30/02 | 707/737 |
| 2011/0138423 A1* | 6/2011 | Pickelsimer | H04N 5/44543 | 725/46 |
| 2011/0167136 A1 | 7/2011 | Naimark et al. | | |
| 2011/0238754 A1 | 9/2011 | Dasilva | | |
| 2011/0258017 A1* | 10/2011 | Koppula | G06Q 10/10 | 705/7.29 |
| 2012/0117167 A1* | 5/2012 | Sadja | G06F 17/3089 | 709/206 |
| 2012/0158514 A1* | 6/2012 | Aldrey | G06Q 30/0269 | 705/14.66 |
| 2012/0167125 A1* | 6/2012 | Grubb | H04N 21/252 | 725/14 |
| 2012/0174157 A1 | 7/2012 | Stinson, III | | |
| 2012/0254910 A1* | 10/2012 | Donoghue | H04H 60/31 | 725/14 |
| 2012/0278830 A1* | 11/2012 | Khoshgozaran | G06Q 30/02 | 725/25 |
| 2012/0284738 A1* | 11/2012 | Narasimhan | H04H 20/38 | 725/16 |
| 2012/0291056 A1* | 11/2012 | Donoghue | H04N 21/26258 | 725/5 |
| 2013/0031162 A1* | 1/2013 | Willis | H04L 67/02 | 709/203 |
| 2013/0035086 A1* | 2/2013 | Chardon | H04N 21/00 | 455/420 |
| 2013/0066973 A1* | 3/2013 | MacAdaan | G06F 3/0482 | 709/204 |
| 2013/0073568 A1* | 3/2013 | Federov | G06Q 50/01 | 707/749 |
| 2013/0166653 A1* | 6/2013 | Sherrets | H04L 67/22 | 709/204 |
| 2013/0167168 A1* | 6/2013 | Ellis | H04N 5/44543 | 725/12 |
| 2013/0212606 A1* | 8/2013 | Kannan | H04N 21/4667 | 725/12 |
| 2013/0263168 A1* | 10/2013 | Choi | H04N 21/4826 | 725/14 |
| 2013/0291037 A1* | 10/2013 | Im | H04N 21/4788 | 725/109 |
| 2013/0346877 A1* | 12/2013 | Borovoy | H04L 65/403 | 715/753 |
| 2014/0150029 A1* | 5/2014 | Avedissian | G06Q 30/0261 | 725/60 |
| 2014/0201766 A1* | 7/2014 | Stepanov | H04N 21/80 | 725/9 |
| 2014/0207893 A1* | 7/2014 | Harris | G06Q 50/01 | 709/207 |
| 2014/0237098 A1* | 8/2014 | Dasilva | G06F 17/3082 | 709/223 |
| 2014/0258469 A1* | 9/2014 | Maharajh | G06F 17/30035 | 709/219 |
| 2014/0325541 A1* | 10/2014 | Hannes | H04N 21/632 | 725/14 |
| 2014/0325547 A1* | 10/2014 | Roberts | G06Q 30/00 | 725/14 |
| 2014/0337883 A1* | 11/2014 | Foote | H04N 21/44222 | 725/34 |
| 2014/0351839 A1* | 11/2014 | Narasimhan | H04H 20/38 | 725/14 |
| 2014/0359647 A1* | 12/2014 | Shoemake | H04N 5/23206 | 725/10 |
| 2015/0220836 A1* | 8/2015 | Wilson | G06Q 30/0631 | 706/46 |
| 2015/0242893 A1* | 8/2015 | Mirchandani | G06Q 30/02 | 705/14.53 |
| 2015/0249857 A1* | 9/2015 | Dion | G06Q 10/10 | 725/109 |
| 2016/0007083 A1* | 1/2016 | Gurha | H04N 21/44222 | 725/13 |
| 2016/0044381 A1* | 2/2016 | Choi | H04N 21/252 | 725/40 |
| 2016/0050447 A1* | 2/2016 | Nicholas | H04N 7/17318 | 725/14 |

(56) References Cited

U.S. PATENT DOCUMENTS

| | | | | |
|---|---|---|---|---|
| 2016/0127437 A1* | 5/2016 | Pichumani | .......... | H04L 65/4076 |
| | | | | 709/219 |
| 2016/0134914 A1* | 5/2016 | Kumar | .................. | G06N 5/047 |
| | | | | 725/14 |
| 2017/0264935 A1* | 9/2017 | Pizzurro | ................ | G06Q 30/02 |

FOREIGN PATENT DOCUMENTS

| | | |
|---|---|---|
| JP | 2011-522455 | 7/2011 |
| JP | 2011-257804 | 12/2011 |
| JP | 2012-151833 | 8/2012 |

OTHER PUBLICATIONS

Defects Prior to Notification of Acceptance of Israeli Patent Application No. 240798, dated Jun. 3, 2016.
JP Office Action Notification of Reasons for Rejection from Japan Patent Office for JP Application No. 2015-561491 (with English translation), dated Feb. 16, 2016.
Canadian Office Action for Application No. 2,902,230, dated Sep. 16, 2015.
Stevens, "IntoNow app can tell what show you're watching, won't knock your Glee addiction (video)",http://web.archive.org/web/20121207134201/http://www.engadget.com/20/02/01/intonow-app-can-tell-what-show-youre-watching-wont-knock-your/, dated Feb. 2, 2011.
Notification of Defects for Israeli Application No. 253777 (with English translation), dated Feb. 28, 2018.
Notice of Allowance for Israeli Application No. 253777 (with English translation), dated Apr. 11, 2019.

* cited by examiner

RANKING VIDEOS FOR A USER

PRIORITY INFORMATION

This application claims the benefit under 35 U.S.C. § 120 of U.S. patent application Ser. No. 13/783,593 titled "RANKING VIDEOS FOR A USER" and filed 4 Mar. 2013.

TECHNICAL FIELD

This disclosure generally relates to ranking electronic content.

BACKGROUND

An individual may be interested in watching one of a number of videos. At times, the individual does not know the video they would like to watch beforehand; at other times, the individual knows which video they would like to watch but must select the video from among the possible options. In either case, the videos currently available (or that will be available in the future) to the individual along with any corresponding descriptions of the videos are presented to the individual according to some logical format. For example, a TV guide presents videos organized by numerically-ordered TV channels available to the user and the times at which the videos will be showing.

SUMMARY OF PARTICULAR EMBODIMENTS

In particular embodiments, videos that a user may watch are ranked based on various factors. Those factors may include factors that would be coincident with the user watching the video. For example, coincident coefficient factors may include the length of time until a video is available to the user, a current monetization associated with the video being displayed, a number of users currently watching the video, or a number of users currently watching the video that are connected in a social-networking system to the user for whom the video is being ranked. Other factors for ranking a video may be non-coincident coefficient factors. For example, non-coincident coefficient factors may include a taste factor based on one or more preferences of the user, a trend of users' actions relating to the video, a number of users that have liked a video, or the number of user that have liked a video and are connected in a social-networking system to the user for whom the video is being ranked. After coefficient factors for a video are determined each coefficient factor may be weighted, and a ranking for the video may be determined using the weights and the coefficient factors. For example, a video coefficient may be the linear combination of coefficient factors multiplied by their respective weights. Once videos have been ranked, the ranked videos or a subset of the videos may be presented to the user in a manner that corresponds to or communicates the video's rank.

DESCRIPTION OF EXAMPLE EMBODIMENTS

Figure 1:
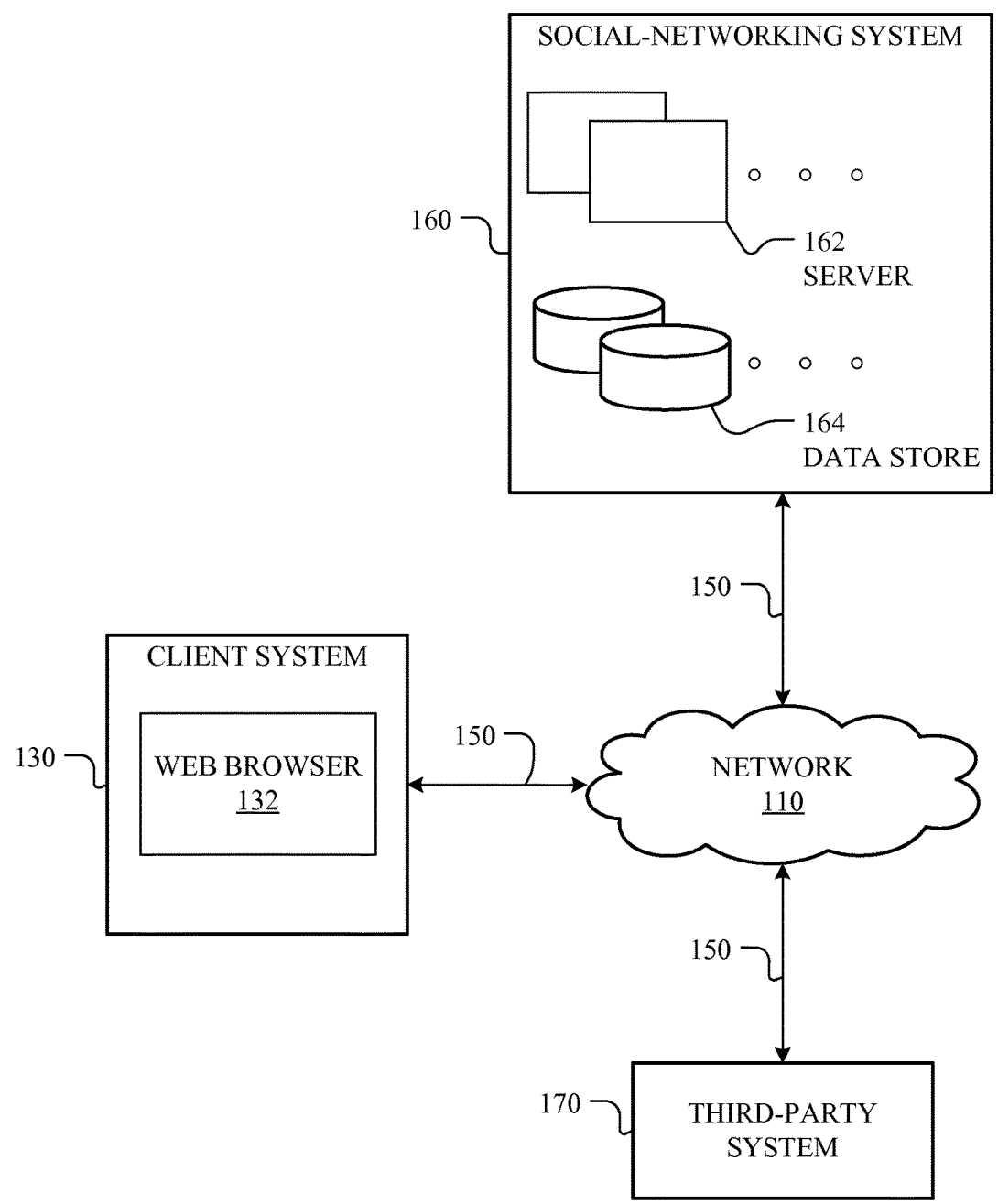
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
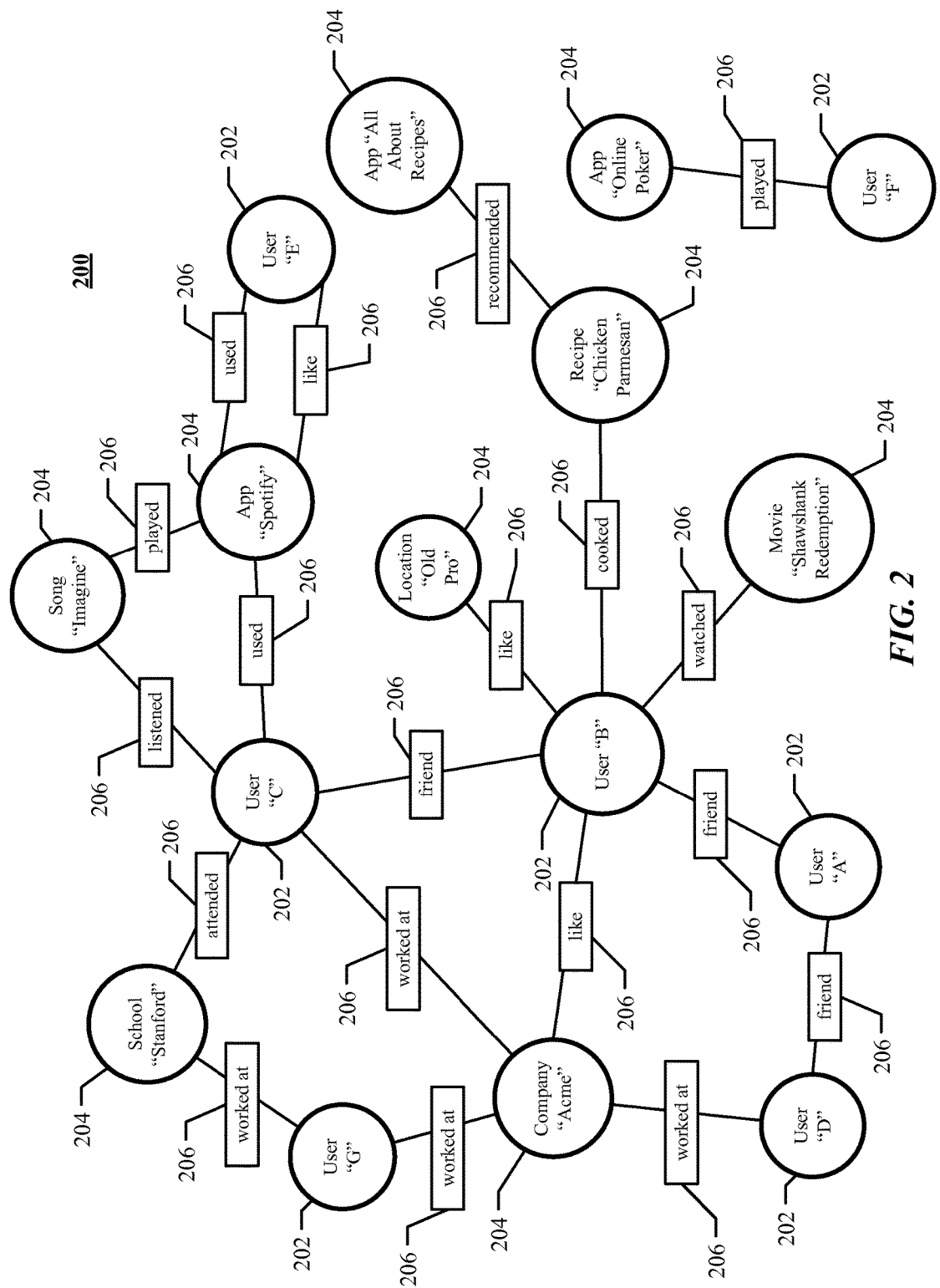
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
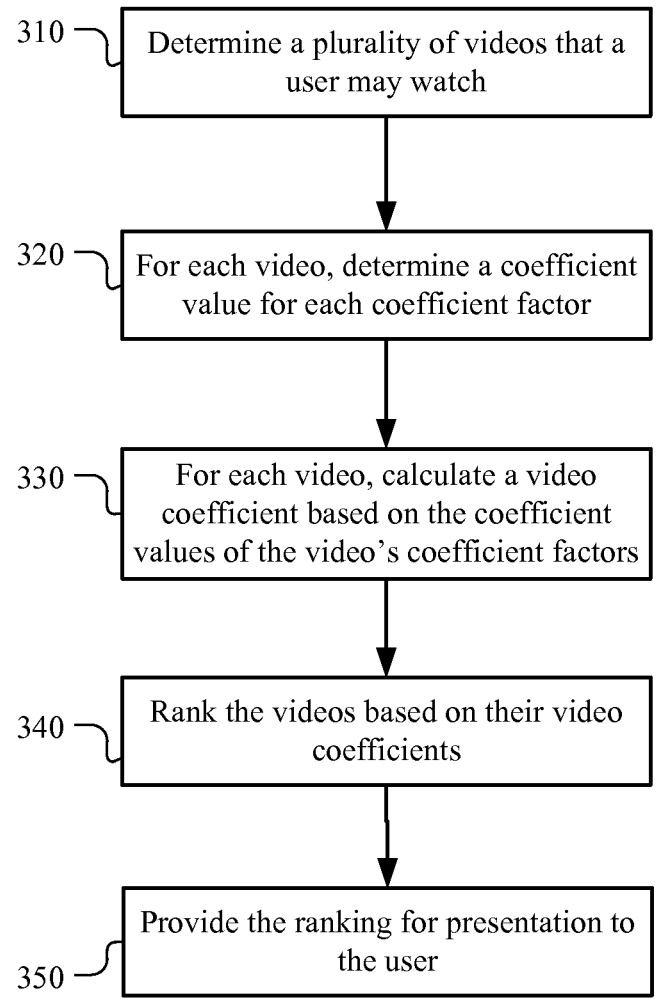
FIG. 3 illustrates an example method for ranking videos that a user of a client computing device may watch.

FIG. 3 illustrates an example method 300 for ranking videos that a user of a client computing device may watch. As used herein, the user for whom a video is being ranked is known as the "contemplated user." A client computing device may be any suitable device, such as a desktop or laptop computer, smartphone, PDA, tablet, television, or any other client computing device suitable for processing video for display or displaying video. A video includes any suitable video, such as a television program, a video on a webpage, a video streamed from a website, a video streamed over a WAN or LAN, or any other suitable video. Videos include live videos, which include videos of live events and videos broadcast or streamed at a specific time; time-shifted or time-delayed videos; on-demand videos, which may be accessed at any time or within any specific timeframes; or videos accessible during any suitable time frame. The method of FIG. 3 may be performed by any suitable computing device, such as a client-computing device or one or more server computing devices associated with any suitable network. In particular embodiments, more than one computing device may perform one or more of the method steps.

The method of FIG. 3 may begin at step 310, where a plurality of videos that a user may watch is determined. The videos a user may watch may depend on the platform used to watch the videos. For example, if a user is interested in watching television programs, then the videos a user may watch are videos available to watch as television programs. As another example, videos may be streaming videos provided by a streaming video service such as Netflix. As another example, videos may be videos available at or hosted by a website such as Youtube. As another example, videos a user may watch may be videos a user has previously selected or interacted with, such as time-shifted television programs that a user has recorded or streaming videos a user has placed in a queue. As another example, videos a user may watch may include OnDemand videos and Pay-per-view videos. In particular embodiments, OnDemand videos and Pay-per-view videos may be behind a paywall, which may be accessed on a subscription or per-use basis. In particular embodiments, the videos available to a user may include videos from more than one platform. In particular embodiments, determining the videos a use may watch may include determining videos available to or accessible by the user across multiple platforms. In particular embodiments, the videos a user may watch may be determined by accessing the videos themselves or by accessing information about the videos. While this disclosure provides specific examples of the videos a user may watch and how those videos may determined, this disclosure contemplates any suitable method for determining videos a user may watch.

At step 320, for each video a coefficient value is determined for each of one or more coefficient factors associated with the video. Coefficient factors are inputs used to determined rankings for videos. Not every coefficient factor available to be used to rank a video may actually be used; for example, select coefficient factors could be used based on user preferences, ranking utility, the preferences of the entity performing the ranking, or computational speed or efficiency. A coefficient value represents the value of the coefficient factor it is associated with. Coefficient values may be determined by any suitable method. While particular examples of this disclosure describe a coefficient value as the absolute value it represents, this disclosure contemplates that any suitable processing or scaling, such as normalization, may be applied to one or more coefficient values.

In particular embodiments, one or more coefficient factors for a particular video being ranked for a user may have a value that is or would be coincident with the user watching the video (a "coincident coefficient factor"). In other words, the time that the user would watch or could watch a video (or times near that time) is an important aspect of those coefficient factors. Other coefficient factors may also depend on time, but the values of those factors may not be coincident with the user watching the video.

In particular embodiments, the number of users of a social network currently watching a video that are connected to the contemplated user is a coincident coefficient factor. Users included in the determination of the value for this factor may include users at any suitable degree of separation in the social network from the contemplated user. For example, in particular embodiments only the friends of the contemplated user, or a selection of those friends, may be included. In other embodiments, friends of friends of the contemplated user may be included as well. In particular embodiments, users having one or more similar attributes to the contemplated user may be included. In particular embodiments, the contemplated user may determine which types of connections or particular connections to use for this coincident coefficient factor. In particular embodiments, the rate of change of the number of users of a social network currently watching the video that are connected to the contemplated user is a coincident coefficient factor. As described above, users included in this determination may be any suitable degree of separation from the contemplated user.

In particular embodiments, the number of users of a social network currently watching a video regardless of connection to the contemplated user is a coincident coefficient factor. This factor may include all users of a social network or a subset of users of the social network, such as users in a particular geographic area, users having one or more similar attributes to or preferences as the contemplated user, etc. In particular embodiments, the rate of change of the number of users of a social network currently watching the video regardless of connection to the contemplated user is a coincident coefficient factor. As described above, users included in this determination may be any suitable degree of separation from the contemplated user.

In particular embodiments, an immediacy of the video being ranked is a coincident coefficient factor. The immediacy of the video describes or indicates a time remaining until the video is watchable by or otherwise available to the user. For example, the immediacy coefficient factor may describe a time until a show is broadcast. As another example, a video that will be available in twenty minutes has a higher immediacy than a video that will be available in a week.

In particular embodiments, a current value of the user watching the video to an entity associated with the video is a coincident coefficient factor. For example, an entity associated with the video may pay more to have a higher-ranked video. The current value of the user watching the video may vary based on the particular user or the time the rankings are determined. The current value of the user watching the video to an entity may be determined by any suitable techniques or algorithms, such as targeting algorithms, etc. In particular embodiments, a video's overall ranking is subject to a user's tastes; a video that the user does not want to watch will not be highly ranked (in relative terms), regardless of value of this coincident coefficient factor.

In particular embodiments, the number of users of a social network who have liked a video and who are connected to the contemplated user is a non-coincident coefficient factor. The users selected to include in the determination of the value for this factor may include users at any suitable degree of separation in the social network from the contemplated user. For example, in particular embodiments only the friends of the contemplated user, or a selection of those friends, may be included. In other embodiments, friends of friends of the contemplated user may be included as well. In particular embodiments, users having one or more similar attributes or preferences as the contemplated user may be included. In particular embodiments, the contemplated user may determine which types of connections to use for this coincident coefficient factor, and/or may select specific connections to user. In particular embodiments, the number of users of a social network who have liked a video regardless of connection to the contemplated user is a coincident coefficient factor. This factor may include all users of a social network or a subset of users of the social network, such as users in a specific geographic area, users sharing one or more attributes or preferences as the user for whom the video is being ranked, etc.

In particular embodiments, one or more trends of users' actions related to a video may be a non-coincident coefficient factor. For example, the rate of change of the number of users of a social network who have liked a video and who are connected to the contemplated user may be a non-coincident coefficient factor. As another example, the rate of change of the number of users of a social network who have liked a video regardless of connection to the contemplated user may be a non-coincident coefficient factor. As another example, the rate of change of user feedback or discussion about the video may be a non-coincident coefficient factor, and may be determined by any suitable method, such as language searches of user-generated content on a social networking system or on the World Wide Web.

In particular embodiments, a taste factor representing, describing, or otherwise indicating one or more preferences of a user for whom a video is being ranked may be a non-coincident coefficient factor. In particular embodiments, taste factor information may include the price or cost to the user of watching a video. For example, such information may include sales or discounts of videos relative to the video's normal or average prices, such as discounts on videos behind a paywall (such as OnDemand and Pay-per-view videos). Such information may also or alternatively include the price of the video. Videos that are on sale, discounted, or cost relatively less than other videos may be ranked more highly than videos that are not on sale, discounted, or cost relatively more. In particular embodiments, the taste factor may include preferences of the user, whether stated explicitly or implicitly determined by the user's actions, connections, posted content, by the tastes of other users having one or more similar attributes or preferences as the user, etc. In particular embodiments, information included in a taste factor may be determined at least in part from a social-networking system. For example, the taste factor may include explicit, stated user interests on a social-networking system or explicit connections of a user to a node, object, entity, brand, or page on the social-networking system. In addition or as an alternative, the taste factor may include explicit or inferred user interests or preferences (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g. "Who is viewing now or has viewed recently the page for COCA-COLA?"); light-weight connections (e.g. "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Importantly, the taste factor may also include one or more privacy settings (such as user opt-outs), data hashing, or data anonymization, as appropriate.

step 330, a video coefficient is calculated for each video based on the video's coefficient values of the coefficient factors. This disclosure contemplates any suitable model, algorithm, or method for calculating video coefficients based on values of coefficient factors. In particular embodiments, a video coefficient may be weighted by a weight associated with the coefficient factor. Weights for coefficient factors may be determined by any suitable method. For example, weights may be determined by information about past user selection of or interaction with ranked videos. Past users may be the user to whom the video rankings are presented, all users to whom a particular video has been presented in a ranking, all users to whom any video rankings have been presented, or users to whom any video rankings have been presented and that share one or more common, relevant traits with the user for whom a video is being ranked. In particular embodiments, machine learning or other suitable techniques may be used to adjust the weights automatically as more information becomes available. In particular embodiments, weights may be based on a user's preferences or the preferences of the entity generating the weights. In particular embodiments, a video coefficient may be determined using a linear combination of coefficient values multiplied by any existing weight associated with the coefficient factors. In other words, a video coefficient V may be calculated using n coefficient factors F and n corresponding weights w according to the following formula:

$$V = w_1 F_1 + w_2 F_2 + w_3 F_3 + \ldots w_n F_n = \Sigma w_i F_i$$

In this example, as for any algorithm used to determined video coefficients, any suitable scaling or processing may be performed on the values of coefficient factors or weights prior to calculating a video coefficient, may be performed on a calculated video coefficient, or may be performed on both. While this disclosure describes specific methods of calculating video coefficients based on coefficient values and any associated weights, this disclosure contemplates any suitable method, model, or algorithm for calculating video coefficients based on coefficient values.

At step 340, videos are ranked based on their video coefficients. In particular embodiments, the rankings may be based solely on the video coefficients; in other words, the order of ranked videos may correspond to the order of video coefficients. In particular embodiments, the rankings may be based in part on the video coefficients and may take into account additional information. In particular embodiments, all videos for which a video coefficient was determined may be ranked. In particular embodiments, only certain videos may be ranked. For example, only those videos with video coefficients exceeding a threshold may be ranked. As another example, only those videos belonging to a certain subset (such as e.g. sports) may be ranked. While this disclosure describes specific ways of ranking videos based on their video coefficients, this disclosure contemplates any suitable way of ranking the videos based on their video coefficients.

At step 350, the rankings are provided to for presentation to the user. In particular embodiments, providing the rankings for presentation to the user includes displaying the rankings to the user. For example, the rankings may be displayed on the client device that the user will use to watch the videos. When presented, the presentation may include interactive elements that allow the user to begin watching the video, navigate to a website hosting the video, access a memory address of a storage device on which the video resides, access information about the video, or any other suitable interaction. In particular embodiments, the rankings may be presented by displaying the videos themselves or links to the videos in the ranked order. In particular embodiments, the rankings may be presented by displaying information describing the rankings. In particular embodiments, the rankings may be presented according to user preferences. For example, a user may indicate which types of video to rank, how many ranked videos should be displayed at once, or any other suitable aspect of the display. In particular embodiments, providing the rankings for presentation to the user includes providing the ranking information to a device or server for further processing before displaying to a user.

For example, the rankings information for a set of streaming videos may be sent to the provider of the streaming videos, who then uses the rankings information to display ranked videos to the user. While this disclosure describes particular examples of providing rankings for presentation to a user, this disclosure contemplates any suitable method of presenting the rankings for presentation to the user.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Moreover, while the example method of FIG. 3 describes a particular way of organizing or grouping coefficient factors, this disclosure contemplates organizing or grouping coefficient factors in any suitable way. For example, coefficient factors may be grouped into one or more of social factors (those describing other users' behavior), immediacy factors, popularity or trend factors, and monetization factors (such as those describing a value to an entity of the user watching the video).

Figure 4:
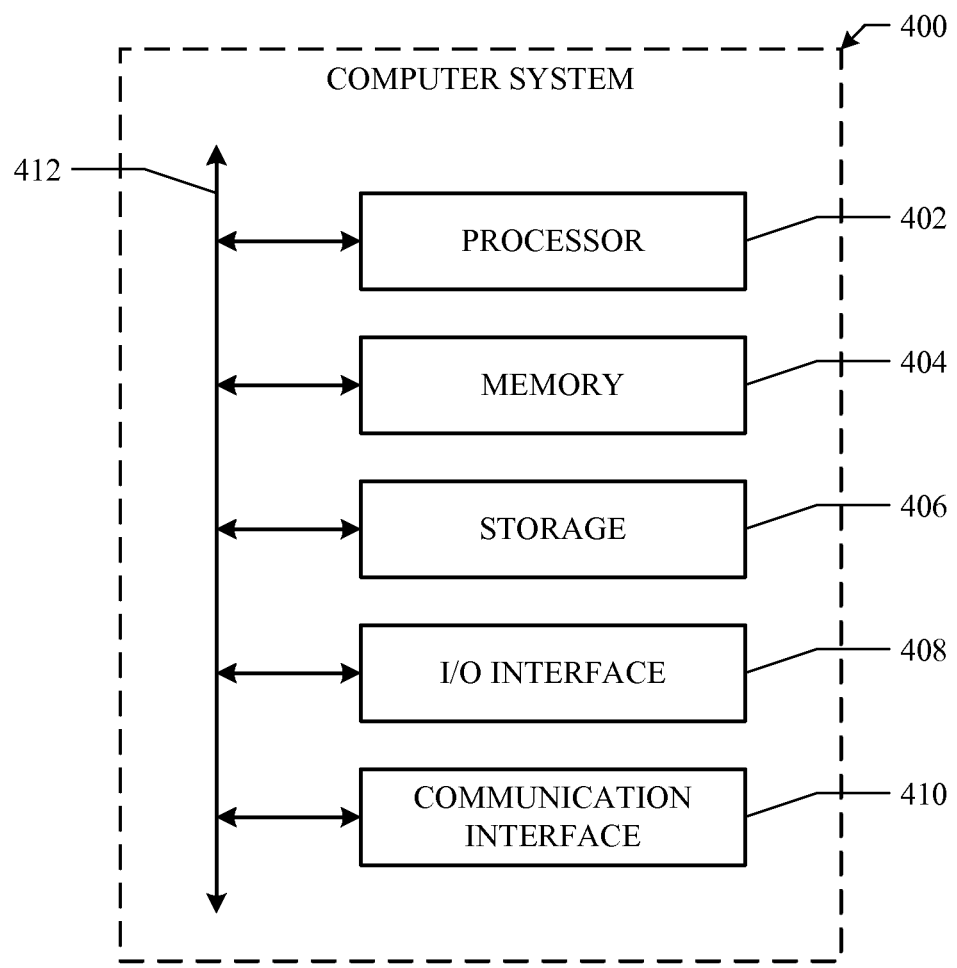
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, determining a plurality of videos a user may watch, wherein each of the videos has a specified period of time of availability to the user;
by one or more computing devices, for each of the videos:
determining a coefficient value for each of one or more coefficient factors, at least one of the coefficient factors having a value that is computed at a time period coincident with the specified period of time of availability to the user, wherein the at least one coefficient factor comprises one or more of:
a number of other users watching the video, during the specified period of time of availability, that are connected to the user within a social-networking system;
a number of any other users, regardless of connection to the user within the social-networking system, that are watching the video during the specified period of time of availability;
an immediacy of the video; or
a value to an entity of the user watching the video during the specified period of time of availability;
determining, for each of the one or more coefficient factors, a user-specific weight; and
calculating a video coefficient based on the coefficient values and the respective user-specific weights of the coefficient factors;
by one or more computing devices, comparing the video coefficient for each video to a threshold coefficient;
by one or more computing devices, ranking, based on the video coefficients, only the videos having a video coefficient above the threshold coefficient;
by one or more computing devices, providing the ranking of the videos for presentation to the user.

2. The method of claim 1, wherein:
the user and other users are users of a social-networking system that comprises a graph comprising a plurality of nodes and edges connecting the nodes, at least one node in the graph corresponding to the user, at least one node in the graph corresponding to each of one or more of the other users; and a connection of another user to the user comprises at least one node in the graph corresponding to the user and at least one node corresponding to the other user being connected to each other by one or more edges.

3. The method of claim 1, wherein at least one of the coefficient factors has a value that is not computed at a time period coincident with the specified period of time of availability to the user.

4. The method of claim 3, wherein a coefficient factor having a value that is not computed at a time period coincident with the specified period of time of availability to the user comprises:
a number of other users that are connected to the user within a social-networking system that have liked the video;
a number of any other users, regardless of connection to the user within the social-networking system, that have liked the video;
a trend of users' actions related to the video; or
a taste factor based on one or more preferences of the user.

5. The method of claim 4, wherein:
the user and other users are users of a social-networking system that comprises a graph comprising a plurality of nodes and edges connecting the nodes, at least one node in the graph corresponding to the user, at least one node in the graph corresponding to each of one or more of the other users; and
a connection of another user to the user comprises at least one node in the graph corresponding to the user and at least one node corresponding to the other user being connected to each other by one or more edges.

6. The method of claim 4, wherein:
the user is a user of a social-networking system that comprises a graph comprising a plurality of nodes and edges connecting the nodes, with at least one node in the graph corresponding to the user; and
at least one of the preferences or the taste factor is based on is determined from information associated with at least one of the plurality of nodes or edges in the social-networking system.

7. The method of claim 1, wherein at least one of the plurality of videos comprises a television program.

8. The method of claim 7, wherein the television program is a live television program.

9. The method of claim 7, wherein:
at least one first coefficient factor comprises a number of other users watching the television program, during the specified period of time of availability, that are connected to the user within a social-networking system;
at least one second coefficient factor comprises a number of any other users, regardless of connection to the user within the social-networking system, that are watching the television program during the specified period of time of availability;
at least one third coefficient factor comprises an immediacy of the television program;
at least one fourth coefficient factor comprises a value to an entity of the user watching the television program during the specified period of time of availability;
at least one fifth coefficient factor comprises a number of other users that are connected to the user within a social-networking system that have liked the television program;
at least one sixth coefficient factor comprises a number of any other users, regardless of connection to the user within the social-networking system, that have liked the television program;

at least one seventh coefficient factor comprises a trend of users' actions related to the video;
at least one eighth coefficient factor comprises a relevance of the television program to the user based on social-networking information associated with the user;
each coefficient factor has an associated weight; and
calculating a video coefficient based on the coefficient values of the coefficient factors comprises calculating the video coefficient using a linear combination of each coefficient factor's value multiplied by the coefficient factor's associated weight.

10. One or more computer-readable non-transitory storage media embodying software that is operable when executed to:
determine a plurality of videos a user may watch, wherein each of the videos has a specified period of time of availability to the user;
for each of the videos:
determine a coefficient value for each of one or more coefficient factors, at least one of the coefficient factors having a value that is computed at a time period coincident with the specified period of time of availability to the user, wherein the at least one coefficient factor comprises one or more of:
a number of other users watching the video, during the specified period of time of availability, that are connected to the user within a social-networking system;
a number of any other users, regardless of connection to the user within the social-networking system, that are watching the video during the specified period of time of availability;
an immediacy of the video; or
a value to an entity of the user watching the video during the specified period of time of availability;
determine, for each of the one or more coefficient factors, a user-specific weight and
calculate a video coefficient based on the coefficient values and the respective user-specific weights of the coefficient factors;
compare the video coefficient for each video to a threshold coefficient
rank, based on the video coefficients, only the videos having a video coefficient above the threshold coefficient; and
provide the ranking of the videos for presentation to the user.

11. The media of claim 10, wherein:
the user and other users are users of a social-networking system that comprises a graph comprising a plurality of nodes and edges connecting the nodes, at least one node in the graph corresponding to the user, at least one node in the graph corresponding to each of one or more of the other users; and
a connection of another user to the user comprises at least one node in the graph corresponding to the user and at least one node corresponding to the other user being connected to each other by one or more edges.

12. The media of claim 10, wherein at least one of the coefficient factors has a value that is not computed at a time period coincident with the specified period of time of availability to the user.

13. The media of claim 12, wherein a coefficient factor having a value that is not computed at a time period coincident with the specified period of time of availability to the user comprises:

a number of other users that are connected to the user within a social-networking system that have liked the video;

a number of any other users, regardless of connection to the user within the social-networking system, that have liked the video;

a trend of users' actions related to the video; or a taste factor based on one or more preferences of the user.

14. The media of claim 13, wherein:

the user and other users are users of a social-networking system that comprises a graph comprising a plurality of nodes and edges connecting the nodes, at least one node in the graph corresponding to the user, at least one node in the graph corresponding to each of one or more of the other users; and a connection of another user to the user comprises at least one node in the graph corresponding to the user and at least one node corresponding to the other user being connected to each other by one or more edges.

15. The media of claim 13, wherein:

the user is a user of a social-networking system that comprises a graph comprising a plurality of nodes and edges connecting the nodes, with at least one node in the graph corresponding to the user; and at least one of the preferences or the taste factor is based on is determined from information associated with at least one of the plurality of nodes or edges in the social-networking system.

16. The media of claim 10, wherein at least one of the plurality of videos comprises a television program.

17. The media of claim 16, wherein:

at least one first coefficient factor comprises a number of other users watching the television program, during the specified period of time of availability, that are connected to the user within a social-networking system;

at least one second coefficient factor comprises a number of any other users, regardless of connection to the user within the social-networking system, that are watching the television program during the specified period of time of availability;

at least one third coefficient factor comprises an immediacy of the television program;

at least one fourth coefficient factor comprises a value to an entity of the user watching the television program during the specified period of time of availability;

at least one fifth coefficient factor comprises a number of other users that are connected to the user within a social-networking system that have liked the television program;

at least one sixth coefficient factor comprises a number of any other users, regardless of connection to the user within the social-networking system, that have liked the television program;

at least one seventh coefficient factor comprises a trend of users' actions related to the video;

at least one eighth coefficient factor comprises a relevance of the television program to the user based on social-networking information associated with the user;

each coefficient factor has an associated weight; and calculating a video coefficient based on the coefficient values of the coefficient factors comprises calculating the video coefficient using a linear combination of each coefficient factor's value multiplied by the coefficient factor's associated weight.

18. A system comprising:

one or more processors; and a memory coupled to the processors comprising instructions executable by the processors, the processors being operable when executing the instructions to:

determine a plurality of videos a user may watch, wherein each of the videos has a specified period of time of availability to the user;

for each of the videos:

determine a coefficient value for each of one or more coefficient factors, at least one of the coefficient factors having a value that is computed at a time period coincident with the specified period of time of availability to the user, wherein the at least one coefficient factor comprises one or more of:

a number of other users watching the video, during the specified period of time of availability, that are connected to the user within a social-networking system;

a number of any other users, regardless of connection to the user within the social-networking system, that are watching the video during the specified period of time of availability;

an immediacy of the video; or a value to an entity of the user watching the video during the specified period of time of availability;

determine, for each of the one or more coefficient factors, a user-specific weight and calculate a video coefficient based on the coefficient values and the respective user-specific weights of the coefficient factors;

compare the video coefficient for each video to a threshold coefficient rank, based on the video coefficients, only the videos having a video coefficient above the threshold coefficient; and provide the ranking of the videos for presentation to the user.

* * * * *